Oct. 12, 1943.  E. D. CLICKNER  2,331,767
FISHING REEL SPOOL MOUNTING
Filed July 30, 1941
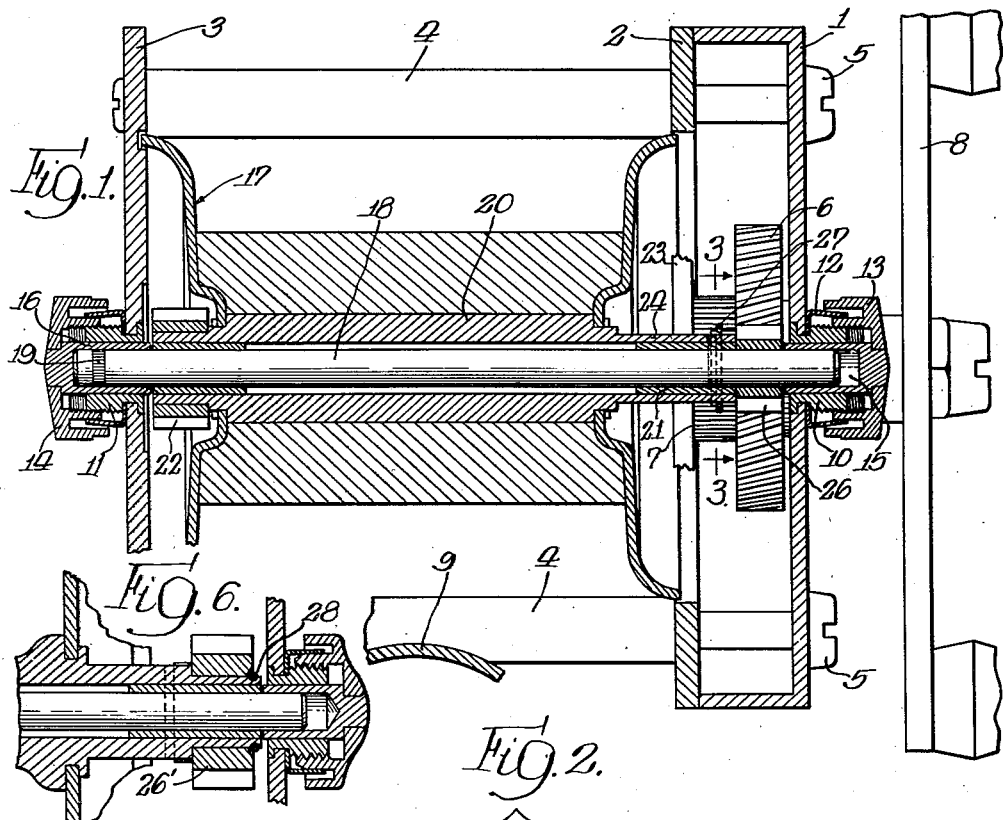
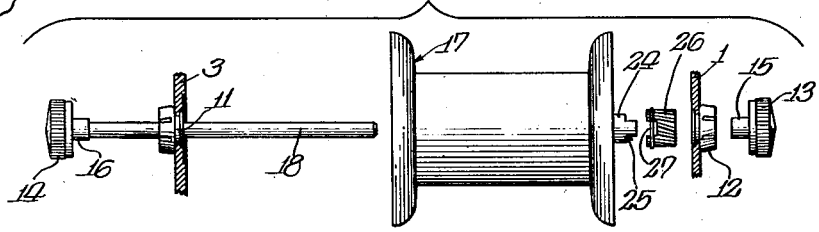
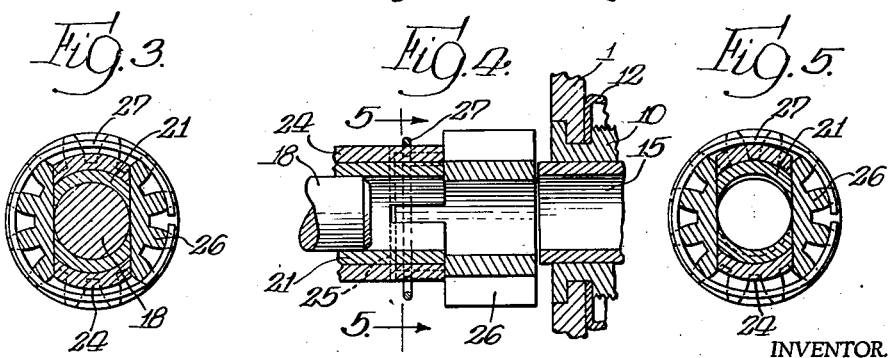
INVENTOR.
Earle D. Clickner,
BY W. F. Kellogg
Atty.

Patented Oct. 12, 1943

2,331,767

UNITED STATES PATENT OFFICE 2,331,767

FISHING REEL SPOOL MOUNTING

Earle D. Clickner, Kalamazoo, Mich., assignor to Shakespeare Company, Kalamazoo, Mich., a corporation of Michigan Application July 30, 1941, Serial No. 404,601

9 Claims. (Cl. 242—84.1)

This invention relates to improvements in fishing reel spool mountings and it is an object of the invention to provide a mounting of the stated character by means of which an equipped spool will be rotatably supported along and substantially throughout its length, hence, imparting materially greater durability and sturdiness to the construction whereby the same will successfully withstand that hard and rough usage to which devices of this sort are so often subjected.

It is furthermore an object of the invention to provide a fishing reel spool mounting of such construction and arrangement of parts as will permit the same to be conveniently and quickly disassembled and reassembled in those instances where adjustment or repair become necessary, or at those times when lubrication of the spool bearings is required.

A further object of the invention is to provide a novel means capable of functioning in a dual capacity, first, to engage and support the stationary shaft at its opposite ends, and second, to permit of regulatable end-play adjustment of the spool carried by the stationary shaft, by so constructing the spool caps as to afford bearing for the stationary shaft and end thrust bearing for the spool.

Yet another and important object of the invention resides in an advantageous and novel mounting of the spool pinion upon the spool barrel, this mounting being such as will allow the spool supporting stationary axle or shaft to be partially or completely withdrawn from the head plate spool bearing or from the spool barrel without causing it to become relatively displaced with respect to the spool barrel and the spool drive gear.

Other objects of the invention will be in part obvious and in part pointed out hereinafter.

In order that the invention and its mode of operation may be readily understood by those skilled in the art to which it appertains, I have in the accompanying drawing and the detailed description based thereupon, set out one embodiment of my invention.

In the drawing:

Figure 1 is a longitudinal section through the reel and provided with a spool bearing constructed in accordance with the invention.

Figure 2 is a disassembled elevational view (parts of the end plates being fragmentally shown) illustrating the elements of the invention.

Figure 3 is a slightly enlarged transverse section taken on the line 3—3 of Figure 1, looking in the direction in which the arrows point.

Figure 4 is an enlarged fragmentary detail in longitudinal section showing the mounting of the spool pinion upon the spool barrel.

Figure 5 is a transverse section taken on the line 5—5 of Figure 4 looking in the direction in which the arrows point, and, Figure 6 is an enlarged fragmentary detail in longitudinal section illustrating a modified form of mounting of the spool pinion.

Having more particular reference to the drawing in connection with which like characters of reference will designate corresponding parts throughout, I have shown my improved spool mounting in connection with a fishing reel including a head cap assembly 1, a head ring 2, and tail plate 3; the head ring and the tail plate being interconnected by pillars 4 and the head cap assembly being connected or secured to the head ring 2 by means of pillar screws designated by the numeral 5. A drive gear 6 and drive gear pinion 7 are mounted within the head cap assembly 1 and have the usual driving connection with a crank 8 through the gear stem (not shown). A cross plate 9 has fixed connection with certain of the pillars 4 and, obviously, provides for mounting of the reel upon the fishing rod.

Spool bushings, respectively indicated by the numerals 10 and 11, are provided concentrically of the head cap assembly 1 and tail plate 3. Each, thereof, are equipped with spool cap friction cups 12.

Spool caps 13 and 14 are provided the bushings 10 and 11 and, by reason of their construction, have screw threaded engagement therewith. These spool caps are provided with inwardly disposed concentrically arranged bearing sleeves 15 and 16.

With a view towards rotatably supporting the reel spool, indicated in its entirety by the numeral 17, I provide a stationary supporting shaft 18. One end of the shaft is knurled or otherwise prepared, as indicated at 19, and fixedly engaged in the bearing sleeve 16 of the bushing 14. This stationary shaft 18 extends coaxially through the barrel 20 of the spool 17 and is movably received within the bearing sleeve 15 of the spool cap 13, as shown in Figure 1 of the accompanying drawing. Suitable bushings or bearing sleeves 21 are fixedly arranged within the barrel 20 of the spool 17 adjacent its opposite ends, and, as will be noted upon reference to Figure 1 of the accompanying drawing, have rotatable engagement upon and about adjacent portions of the stationary shaft 18 when the latter is mounted between the respective bearing sleeves of the spool caps 13 and 14.

The spool barrel 20, may, of course, be provided with the usual click ratchet 22 upon that end adjacent the tail plate 3, adapted, at times, to be engaged by a tail plate carried click pawl (not shown); also, that a suitable bridge 23 is secured within the head cap assembly and serves to complete support for the drive gear 6 and the gear pinion 7, the latter of which serves to transmit rotary motion to the line carriage screw of a line level winding means, not shown herein.

In order that rotary motion may be transmitted from the crank 8 through the drive gear 6 to the rotatably mounted spool 17, the barrel of the latter is provided on its head cap assembly side with a co-axially extended sleeve, indicated at 24. The free end of this extension is shouldered, as at 25, and is adapted to interfittingly receive the correspondingly formed adjacent end of a loose spool pinion 26, in the manner shown in Figures 1, 3, 4 and 5. The stationary shaft 18, of course, is received through the loose spool pinion 26 which, in turn, meshes with the teeth of the drive gear 6. Consequently, with rotation of said drive gear 6, rotary motion will be transmitted via the loose spool pinion 26 to the spool 17 through the shouldered extension 24 having interfitting or interlocking engagement with said pinion 26.

It is now understood that the bearing sleeves 15 and 16 of the respective spool caps 13 and 14 serve to engage and support the stationary shaft 18 at its opposite ends. It is to be also understood that these spool cap carried bearing sleeves provide adjustable end thrust bearing for the spool barrel 20 in order that end-play adjustment will be accorded the reel spool 17 to insure its efficient rotation. In this connection, it will be seen, upon reference to Figure 1 of the drawing, that the adjustable friction retained spool caps 13 and 14 are rotatable upon their respective spool bushings 10 and 11 and thus, will allow for effectual adjustment of the inner ends of the bearing sleeves 15 and 16 with relation, first, to the outer end of the loose spool pinion 26 and, second, with relation to the tail end of the reel spool barrel 20, thereby acting as end thrust bearings and providing the spool with those desirable advantages of end-play adjustment peculiar to the rotatable shaft type of fishing reel spool.

To prevent undesirable and annoying displacement of the loose spool pinion 26 from the shouldered extension 24, at that time when the stationary shaft 18 is withdrawn from the pinion, in the manner indicated in Figure 4 of the drawing, I notch or otherwise form the inner side of the pinion periphery and engage a circular retaining wire or ring 27 thereabout. Obviously, portions of this retaining ring 27 engage over that space formed by the shouldering of the inner end of the pinion. Thus, with withdrawal of the stationary shaft 18 from or through the pinion 26, displacement with respect to the extension 24 will be prevented by reason of the supporting connection between this retaining ring 27 and an adjacent portion of the shouldered end 25 of the extension 24. Because of this novel mounting of the loose spool pinion 26, it will be quite readily understood that the stationary shaft 18 may be reintroduced through the spool barrel 20 and, through its extension 24 and said pinion 26; moreover, that driving relationship will be maintained as between the drive gear 6 and the spool 17.

In Figure 6 of the accompanying drawing, I have illustrated another and satisfactory embodiment of my invention; particularly, another form of mounting for the spool pinion 26. In this embodiment of the invention, the co-axially extended sleeve of the reel spool barrel 20 has its outer end reduced. This reduced outer end portion, preferably, has two sides flattened to receive the slot of the pinion 26' thereupon. With engagement of the pinion 26' on said reduced outer end portion, the same is locked against relative movement or longitudinal displacement by means of a locking ring 28 engaged, as shown in Figure 6, with or over the outer end of the extension. Thus, the pinion 26' does not rotate upon the stationary shaft 18, as does the pinion 26 illustrated in the first described embodiment of my invention, but rather, it is carried upon and rotates with the extended sleeve 24. Consequently, wear upon the shaft 18, at that point, is reduced.

From the foregoing, it will be understood and appreciated by workers skilled in the art, that I have provided a novel, practical and substantially rigid mounting for reel spools; a mounting by means of which the spool will be effectually supported throughout the entire length of its barrel, in sharp contradistinction to rotatable supporting of the spool from or near its opposite extremities. Such construction provides for greater durability and ruggedness of an equipped reel. The construction, moreover, is capable of convenient and quick disassembly and assembly, when occasion therefor arises and also, it will be obvious that lubricant may be conveniently and effectually supplied to the bushings 21 of the spool barrel 20 from that space between the intermediate portion of the barrel and the corresponding portion of the stationary shaft 18.

I claim:

1. A fishing reel, including head and tail plates, a spool having a barrel disposed therebetween, a stationary shaft engaged through the plates and spool barrel rotatably supporting the latter, spool caps adjustably engaged with portions of the head and tail plates adjacent those portions of the shaft engaged therethrough, and bearing means carried by said caps passing through said head and tail plates and receiving adjacent portions of the stationary shaft therein capable of thrust engagement with the spool.

2. A fishing reel, including head and tail plates, a spool having a barrel disposed therebetween, a stationary shaft engaged with the plates and spool barrel rotatably supporting the latter, spool caps detachably and adjustably engaging portions of the head and tail plates, and inwardly disposed sleeves on the caps receiving the opposite end portions of said shaft therein and adjustably engageable with the spool barrel.

3. In combination with the head and tail plates and spool of a fishing reel, a bearing rod removably engaged in said plates and through the barrel of the spool rotatably supporting the spool, spool caps detachably and adjustably engaging portions of the head and tail plates in proximity to the end portions of said rod, and thrust bearing means on said caps passing through said head and tail plates and engaged with portions of said bearing rod capable of thrust engagement with the spool.

4. In combination with the head and tail plates and spool of a fishing reel, a bearing rod received through said plates and the barrel of the spool rotatably supporting the latter, spool caps movably engaging portions of the head and tail plates, and inwardly extending sleeves on the caps receiving portions of said rod therein, one thereof being fixed to that portion of the rod received thereby, and each said sleeves being capable of thrust engagement with the spool.

5. A spool for fishing reels, including a barrel, a coaxially disposed extension on one end of the barrel having its free end shouldered, a pinion having recesses formed in one end thereof engageable by either longitudinally or radial movement over the shouldered free end of said extension, and retaining means engaging the shouldered free end of said extension and the adjacent portions of said pinion whereby to prevent separation of the pinion from said extension by radial movement of the former.

6. A spool for fishing reels, including a hollow barrel, a co-axially disposed hollow extension on one end of the barrel having its free end shouldered, a pinion having recesses formed in one end thereof receivable over the shouldered free end of said extension, and retaining means engaged about and over the shouldered free end of said extension and the adjacent portion of said pinion.

7. A spool for fishing reels, including a barrel, a co-axially disposed extension on one end of the barrel, a pinion in juxtaposed relationship to the free end of said extension, the corresponding end portions of the extension and the pinion being either longitudinally or radially interengaged, and retaining means engaged about and over said interengaged portions of said extension and pinion whereby to prevent separation of the pinion from said extension by radial movement of the former.

8. A spool for fishing reels, including a barrel, a pinion in juxtaposed relationship to one end of said barrel, the adjacent end portions of the barrel and the pinion being formed for interengagement by either longitudinal or radial movement, and retaining means engaged about and over the interengaged portions of said end of the barrel and said pinion whereby to prevent separation of the pinion from said end of the barrel by radial movement of the former.

9. In combination with the head and tail plates and spool of a fishing reel, a bearing rod received through said plates and the barrel of the spool rotatably supporting the spool, spool caps movably engaged with portions of the head and tail plates in proximity to the end portions of said rod, and thrust bearing means on said spool caps passing through said head and tail plates and engaging the end portions of said bearing rod, capable of variable engagement with the spool, and one of said bearing means being fixedly connected to the bearing rod.

EARLE D. CLICKNER.